US012608719B2

(12) United States Patent
Schwabe et al.

(10) Patent No.: US 12,608,719 B2
(45) Date of Patent: Apr. 21, 2026

(54) SUPPLY CHAIN OPTIMIZATION

(71) Applicant: BASF SE, Ludwigshafen am Rhein (DE)

(72) Inventors: Henning Schwabe, Ludwigshafen am Rhein (DE); Jan Schoeneboom, Ludwigshafen am Rhein (DE); Steffen Thomas Klosterhalfen, Ludwigshafen am Rhein (DE); Tara Badri, Florham Park, NJ (US); Nicole Graf, Ludwigshafen am Rhein (DE); Anthony Nicholas Diprinzio, Newtown Square, PA (US); Stefanie Kraus, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 151 days.

(21) Appl. No.: 18/683,363

(22) PCT Filed: Aug. 12, 2022

(86) PCT No.: PCT/EP2022/072699
§ 371 (c)(1),
(2) Date: Feb. 13, 2024

(87) PCT Pub. No.: WO2023/017162
PCT Pub. Date: Feb. 16, 2023

(65) Prior Publication Data
US 2024/0346523 A1 Oct. 17, 2024

(30) Foreign Application Priority Data
Aug. 13, 2021 (EP) .................................... 21191364

(51) Int. Cl.
*G06Q 50/04* (2012.01)
*G06F 16/21* (2019.01)
(Continued)

(52) U.S. Cl.
CPC ........... *G06Q 30/018* (2013.01); *G06F 16/21* (2019.01); *G06F 16/24578* (2019.01); *G06Q 50/04* (2013.01); *G06F 2219/10* (2013.01)

(58) Field of Classification Search
CPC ...... G06Q 30/018; G06Q 50/04; G06F 16/21; G06F 16/24578; G06F 2219/10
See application file for complete search history.

(56) References Cited

U.S. PATENT DOCUMENTS

2004/0254742 A1* 12/2004 Long ...................... G06Q 10/06
702/30
2005/0015287 A1 1/2005 Beaver
(Continued)

OTHER PUBLICATIONS

Bortz. M. et al., "Multi-criteria optimization in chemical process design and decision support by navigation on Pareto sets" 2014, Computers & Chemical Engineering, vol. 60, pp. 354-363 (Year: 2014).*

(Continued)

*Primary Examiner* — Jeff Zimmerman
*Assistant Examiner* — Wayne S. Murray
(74) *Attorney, Agent, or Firm* — ArentFox Schiff LLP

(57) ABSTRACT

A computer-implemented method for producing a product by selection of one or more chemical precursors, the method comprising: (a) receiving, from an interface, at least two data sets comprising (i) material data related to chemical or physical properties of the one or more chemical precursors and (ii) environmental impact metrics data related to environmental impact metrics for the one or more chemical precursors necessary for manufacturing the product; (b) providing an environmental impact calculation model describing a functional relationship between the material data and the environmental impact metrics data; (c) optionally retrieving, from a database, historical environmental impact metrics data for the one or more chemical precursors, (Continued)

Minimum Economic Benefit

Minimum Environmental Impact Reduction

Economic Benefit

Environmental Impact Reduction

● Offer Supplier 1
▲ Offer Supplier 2
■ Offer Supplier 3
◆ Offer Supplier 4 the historical environmental impact metrics data comprising historic environmental impact metrics corresponding to the one or more chemical precursors; (d) ranking the at least two data sets by a distance from predefined minimum values in multiple dimensions of the environmental impact calculation model and generating thereon based ranking results; and (e) optionally obtaining a degree of matching between the ranking results of the environmental impact calculation model and the historical environmental impact metrics data and generating thereon based matching results; and (f) selecting one or more chemical precursors out of a plurality of chemical precursors based on the ranking results and/or the matching results and adding the selected one or more chemical precursors to a production process of the product.

15 Claims, 10 Drawing Sheets

(51) Int. Cl.
*G06F 16/2457* (2019.01)
*G06Q 30/018* (2023.01)

(56) References Cited

U.S. PATENT DOCUMENTS

| 2011/0246397 | A1* | 10/2011 | Predale | G06Q 10/06 |
| | | | | 705/500 |
| 2013/0012425 | A1* | 1/2013 | Jefferis | C11D 3/2086 |
| | | | | 510/229 |
| 2021/0095141 | A1* | 4/2021 | Foshey | B29C 64/112 |

OTHER PUBLICATIONS

Bortz et al., "Multi-criteria optimization in chemical process design and decision support by navigation on Pareto sets," Computers and Chemical Engineering, vol. 60 (2014), pp. 354-363.
International Search Report mailed Nov. 21, 2022, in PCT/EP2022/072699.
Kufer et al., "Multicriteria Optimization in Intensity Modulated Radiotherapy Planning," Handbook of Optimization in Medicine, 2009, pp. 123-167.

* cited by examiner

SUPPLY CHAIN OPTIMIZATION

CROSS-REFERENCE TO RELATED APPLICATIONS

This application is a National Stage Entry of PCT/EP2022/072699, filed Aug. 12, 2022, which claims priority to European Application No. 21191364.5, filed Aug. 13, 2021, the disclosures of each of which are hereby incorporated by reference in their entireties.

TECHNICAL FIELD

The present disclosure generally relates to a method and a platform for selecting of one or more chemical precursors for producing a product, a computer program element, and a computer readable medium.

TECHNICAL BACKGROUND

Economic actors are increasingly concerned about the negative impact of their operations on environment and society, that are not integrated into the economic steering of a company. One example is the impact of economic activity on the so-called environmental/sustainability goals of communities and countries of operation. Calculation standards for impact metrics are established which allow the calculation of impact reductions resulting from economic decisions (e.g., for product carbon footprint, ethical sourcing, recycled material content, and material recyclability). Yet, input data for these calculations sourced from suppliers (scope 3 data) today is unreliable and incomplete while data from data consultants is based on approximations.

There may be a need to improve a system or a method for selecting of one or more chemical precursors for producing a product and for multi-objective optimization of materials.

SUMMARY

According to a first aspect of the present disclosure, there is provided a computer-implemented method for selecting of one or more chemical precursors for producing a product, the method comprising the following steps of:

As a first step of the method receiving, from an interface, at least two data sets are provided comprising: (i) material data related to chemical or physical properties of the one or more chemical precursors and (ii) environmental impact metrics data related to environmental impact metrics for the one or more chemical precursors necessary for manufacturing the product.

As a second step of the method, an environmental impact calculation model is provided describing a functional relationship between the material data and environmental impact metrics data is performed.

As a third, optional step of the method, historical environmental impact metrics data for the one or more chemical precursors are retrieved from a database, wherein the historical environmental impact metrics data comprising historic environmental impact metrics corresponding to the one or more chemical precursors.

Further, ranking the at least two data sets by a distance from predefined minimum values in multiple dimensions of the environmental impact calculation model and generating thereon based ranking results is performed.

Further, optionally, obtaining a degree of matching between the ranking results of the environmental impact calculation model and the historical environmental impact metrics data and generating thereon based matching results is performed.

Further, selecting one or more chemical precursors out of a plurality of chemical precursors based on the ranking results and/or the matching results and adding the selected one or more chemical precursors to a production process of the product is performed.

A further aspect of the present disclosure relates to an apparatus for generating operation conditions usable to control a manufacturing or development process, the apparatus comprising: one or more computing nodes and one or more computer-readable media having thereon computer-executable instructions that are structured such that, when executed by the one or more computing nodes, cause the apparatus to perform the following steps:

(a) receiving (100), from an interface, at least two data sets comprising (i) material data related to chemical or physical properties of the one or more chemical precursors and (ii) environmental impact metrics data related to environmental impact metrics for the one or more chemical precursors necessary for manufacturing the product;

(b) providing (110) an environmental impact calculation model describing a functional relationship between the material data and the environmental impact metrics data;

(c) optionally retrieving (120), from a database, historical environmental impact metrics data for the one or more chemical precursors, the historical environmental impact metrics data comprising historic environmental impact metrics corresponding to the one or more chemical precursors;

(d) ranking (130) the at least two data sets by a distance from predefined minimum values in multiple dimensions of the environmental impact calculation model and generating thereon based ranking results; and (e) optionally obtaining (140) a degree of matching between the ranking results of the environmental impact calculation model and the historical environmental impact metrics data and generating thereon based matching results; and (f) selecting (150) one or more chemical precursors out of a plurality of chemical precursors based on the ranking results and/or the matching results and adding (160) the selected one or more chemical precursors to a production process of the product.

A further aspect of the present disclosure relates to a system configured for facilitating purchase of one or more chemical precursors for use in the manufacturing of a product, the system comprising: one or more hardware processors configured by machine-readable instructions to carry out a computer-implemented method for producing a product by selection of one or more chemical precursors as described herein.

A further aspect of the present disclosure relates to a computing platform configured for facilitating purchase of one or more chemical precursors for use in the manufacturing of a product, the computing platform comprising: a non-transient computer-readable storage medium having executable instructions embodied thereon to carry out a computer-implemented method for producing a product by selection of one or more chemical precursors as described herein; and one or more hardware processors configured to execute the instructions embodied in the non-transient computer-readable storage medium.

A further aspect of the present disclosure relates to a method for production of a chemical product from chemical precursors, the method comprising: producing the chemical product from the chemical precursors using during the production process the ranking results and/or the matching results of the computer-implemented method for producing a product by selection of one or more chemical precursors as described herein.

A further aspect of the present disclosure relates to a method for selecting one or more precursors for producing a chemical product, the method comprising: selecting the one or more precursors for producing the chemical product using the ranking results and/or the matching results of the computer-implemented method for producing a product by selection of one or more chemical precursors as described herein.

A further aspect of the present disclosure relates to a method for selecting one or more production facility for producing a chemical product, the method comprising: selecting the one or more production facility for producing the chemical product using the ranking results and/or the matching results of the a computer-implemented method for producing a product by selection of one or more chemical precursors as described herein.

A further aspect of the present disclosure relates to use of the ranking results and/or the matching results of the computer-implemented method for producing a product by selection of one or more chemical precursors as described herein.

A further aspect of the present disclosure relates to a computer program product comprising instructions which, when the program is executed by a computer, cause the computer to carry out the steps of the computer-implemented method for producing a product by selection of one or more chemical precursors as described herein.

According to a further aspect of the present disclosure, there is provided a computer readable medium having stored the program element.

This and embodiments described herein relate to the methods, apparatus, the system, use, the computer program element lined out above and vice versa. Advantageously, the benefits provided by any of the embodiments and examples equally apply to all other embodiments and examples and vice versa.

As used herein "determining" also includes "estimating, calculating, initiating or causing to determine", and "providing" also includes "initiating or causing to determine, generate, select, send, query or receive".

It is an object of the present disclosure to improve a system or a method for selecting of one or more chemical precursors for producing a product and for multi-objective optimization of materials.

The object of the present disclosure is solved by the subject-matter of the independent claims, wherein further embodiments are incorporated in the dependent claims. It should be noted that the following described aspects of the present disclosure apply also for the computer-implemented method, the device, the apparatus, the computer program element, and the computer readable medium.

The present disclosure advantageously provides a solution to allow the actors in a supply chain to reliably reduce negative environmental impacts of economic activity while at the same time maximize their economic benefit, given best available technology in the market. Buyers need a system that uses supplier data to calculate the optimal trade-off between environmental impact reduction and economic benefit (e.g., contribution margin). In addition, they need to check the result for robustness against variations in the supplier data. Buyers need a system that incentivizes suppliers to offer quantitative environmental impact reductions.

Finally, the present disclosure advantageously provides a solution to incentivize suppliers to improve reliability of the environmental impact data they provide to customers. Suppliers, on the other hand, need a system that connects environmental impact reductions required by customers to quantitative economic incentives.

The environmental impact metrics data related to the environmental impact may indicate an environmental performance of one or more chemical precursors. The property related to the environmental impact may be associated with the environmental impact of one or more precursors at any stage during its lifecycle. The stages of the precursor lifecycle may include the stages of providing raw material or components/parts to be used for producing a chemical precursor, producing a chemical precursor, producing a product using one or more chemical precursors, treating end-of-life products, recycling end-of-life products, disposing end-of-life products, reusing components from end-of-life products, or any subset of stages.

The environmental impact metrics data related to environmental impact may be specified or may be derived from any activity of one or more entities participating at any stage of the lifecycle of one or more product(s). The environmental impact metrics data related to the environmental impact may include one or more properties/characteristic(s) that are attributable to environmental impact of a product. The environmental impact metrics data related to environmental impact may include environmental, technical or circularity characteristics(s) associated with the environmental impact of one or more product(s). Environmental characteristic(s) may specify or quantify ecological criteria associated with the products environmental impact. Environmental characteristic(s) may be or may be derived from measurements taken during the lifecycle of one or more product(s). Environmental characteristics may be determined at any stage of the product lifecycle and may characterize the environmental impact of the product for such stage or up to such stage.

Environmental properties/characteristic(s) may for example include data related to carbon footprint, greenhouse gas emissions, resource usage, air emissions, ozone depletion potential, water pollution, noise pollution or eutrophication potential, biodegradability. Environmental characteristic(s) may for example include product characteristics related to the production of the product like bio based, vegan, halal, kosher, palm oil-free, natural or the like. Technical characteristic(s) may specify or quantify product performance at least indirectly associated with the environmental impact. Technical characteristic(s) may be or may be derived from measurements taken during the lifecycle of one or more product(s). Technical characteristics may be determined at any stage of the product lifecycle and may characterize the product performance for such stage or up to such stage. Technical characteristic(s) may for example include product composition data, bill of materials, product specification data, product component data, product safety data, application property data, application instructions or product quality data. Circularity characteristic(s) may specify or quantify the products life cycle characteristics associated with circular uses. Circularity characteristic(s) may be or may be derived from measurements taken during the lifecycle of one or more product(s). Circularity characteristic(s) may be or may be derived from circular data recorded in one or more prior lifecycle(s) including reuse. Circularity characteristics may be determined at any stage of the product lifecycle and may characterize the reuse or recycling performance for such stage or up to such stage. Circularity characteristic(s) may for example include recycling data, reuse rate, recycling rate, recycling loops, reuse reused product performance, reused product quality or the like.

The term emission data is to be understood broadly in the present case and comprises any data related to environmental footprint. The environmental footprint may refer to an entity and its associated environmental footprint. The environmental footprint may be entity specific. For instance, the environmental footprint may relate to a product, a company, a process such as a manufacturing process, a raw material or basic substance, a chemical product or material, a component, a component assembly, an end product, combinations thereof or additional entity-specific relations. Emission data may include data relating to carbon footprint of a chemical product. Emission data may include data relating to greenhouse gas emissions e.g. released in production of the chemical product. Emission data may include data related to greenhouse gas emissions. Greenhouse gas emissions may include emissions such as carbon dioxide ($CO_2$) emission, methane ($CH_4$) emission, nitrous oxide ($N_2O$) emission, hydrofluorocarbons (HFCs) emission, perfluorocarbons (PFCs) emission, sulphurhexafluoride ($SF_6$) emission, nitrogen trifluoride ($NF_3$) emission, combinations thereof and additional emissions. Emission data may include data related to greenhouse gas emissions of an entities or companies own operations (production, power plants and waste incineration). Scope 2 comprise emissions from energy production, which is sourced externally. Scope 3 comprise all other emissions along the value chain. Specifically, this includes the greenhouse gas emissions of raw materials obtained from suppliers. Product Carbon Footprint (PCF) sum up greenhouse gas emissions and removals from the consecutive and interlinked process steps related to a particular product. Cradle-to-gate PCF sum up greenhouse gas emissions based on selected process steps: from the extraction of resources up to the factory gate where the product leaves the company. Such PCFs are called partial PCFs. In order to achieve such summation, each company providing any products must be able to provide the scope 1 and scope 2 contributions to the PCF for each of its products as accurately as possible, and obtain reliable and consistent data for the PCFs of purchased energy (scope 2) and their raw materials (scope 3).

The term chemical product is to be understood broadly in the present case and comprises chemical products obtained from chemical reactions as well as natural chemical products. Natural chemical products encompass any chemical substance that is naturally occurring, i.e. any unprocessed chemical substance that is found in nature, such as chemicals from plants, micro-organisms, animals, the earth and the sea or any chemical substance that is found in nature and extracted using a process that does not change its chemical composition. Natural chemical products may include biologicals like enzymes as well naturally occurring inorganic or organic chemical products. Natural chemical products can be isolated and purified prior to their use or they can be used in unisolated and/or unpurified form. Chemical products obtained from chemical reactions may be any inorganic or organic chemical product obtained by reacting inorganic and/or organic chemical reactants. The inorganic and organic chemical reactants may be naturally occurring chemical products or can be chemical products obtained from chemical reactions. Chemical reactions may include any chemical reaction commonly known in the state of the art in which the reactants are converted to one or more different chemical products. Chemical reactions may involve the use of catalysts, enzymes, bacteria, etc. to achieve the chemical reaction between the reactants.

The term material data is to be understood broadly in the present case and comprises data related to a property of the product and/or data related to the use of the (chemical) product. Such property may be a static or a dynamic property. A static property may be a property constant over time e.g. melting point, boiling point, density, hardness, flammability or the like. A dynamic property may be a property that changes over time e.g. shelf life, pH value, color, reactivity. Property of the chemical product may include performance properties, chemical properties, such as flammability, toxicity, acidity, reactivity, heat of combustion and/or physical properties such as density, color, hardness, melting and boiling points, electrical conductivity or the like. Data related to the use of the chemical product may include data related to further processing of the chemical product, for example by using the chemical product as reactant in further chemical reaction(s) and/or data related to the use of the chemical product, for example data related to the use of the chemical product in a treatment process and/or within a manufacturing process. Chemical product data may include chemicals data, emission data, recyclate content, bio-based content and/or production data.

According to an embodiment of the present disclosure, the environmental impact calculation model comprises at least one multi-criteria optimization algorithm.

According to an embodiment of the present disclosure, the product is a chemical product manufactured in a chemical production process from the one or more chemical precursors.

According to an embodiment of the present disclosure, the chemical product is defined or described by a chemical formulation.

According to an embodiment of the present disclosure, the product is a chemical product, preferably a polymeric product, wherein the one or more chemical precursors undergo a chemical reaction during manufacturing of the product.

According to an embodiment of the present disclosure, the method further comprises transmitting of improved environmental impact metrics data if a deviation of the environmental impact metrics data from predefined minimum values of the environmental impact metrics data is above a predetermined threshold value.

According to an embodiment of the present disclosure, the method further comprises transmitting of updated environmental impact metrics data if a degree of ranking and/or matching of the ranking results and/or the matching results is below a predetermined threshold value.

As used herein, the term "unit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the disclosure will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION OF EMBODIMENTS

The following embodiments are mere examples for implementing the method, the system, the apparatus, or application device disclosed herein and shall not be considered limiting.

Figure 1:
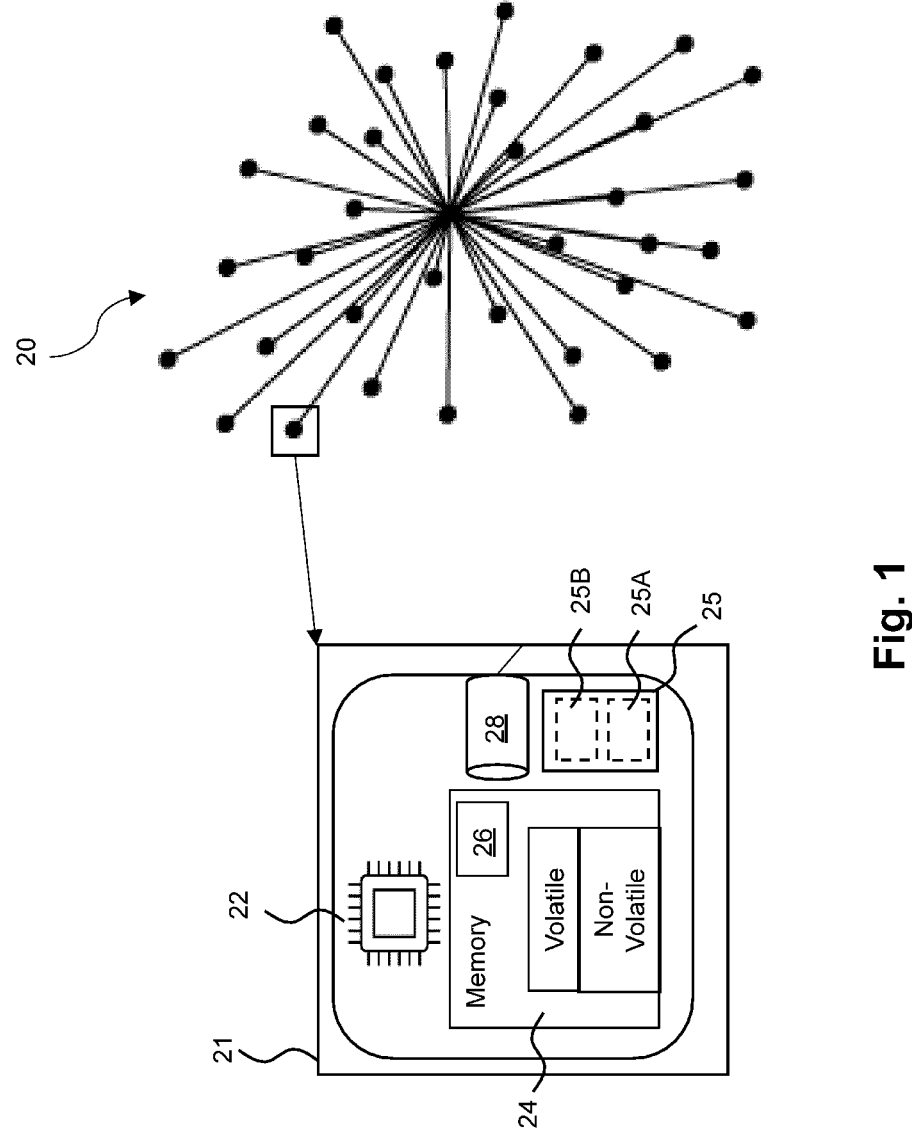
FIG. 1 illustrate example embodiments of a centralized and a decentralized computing environment with computing nodes.
Figure 2:
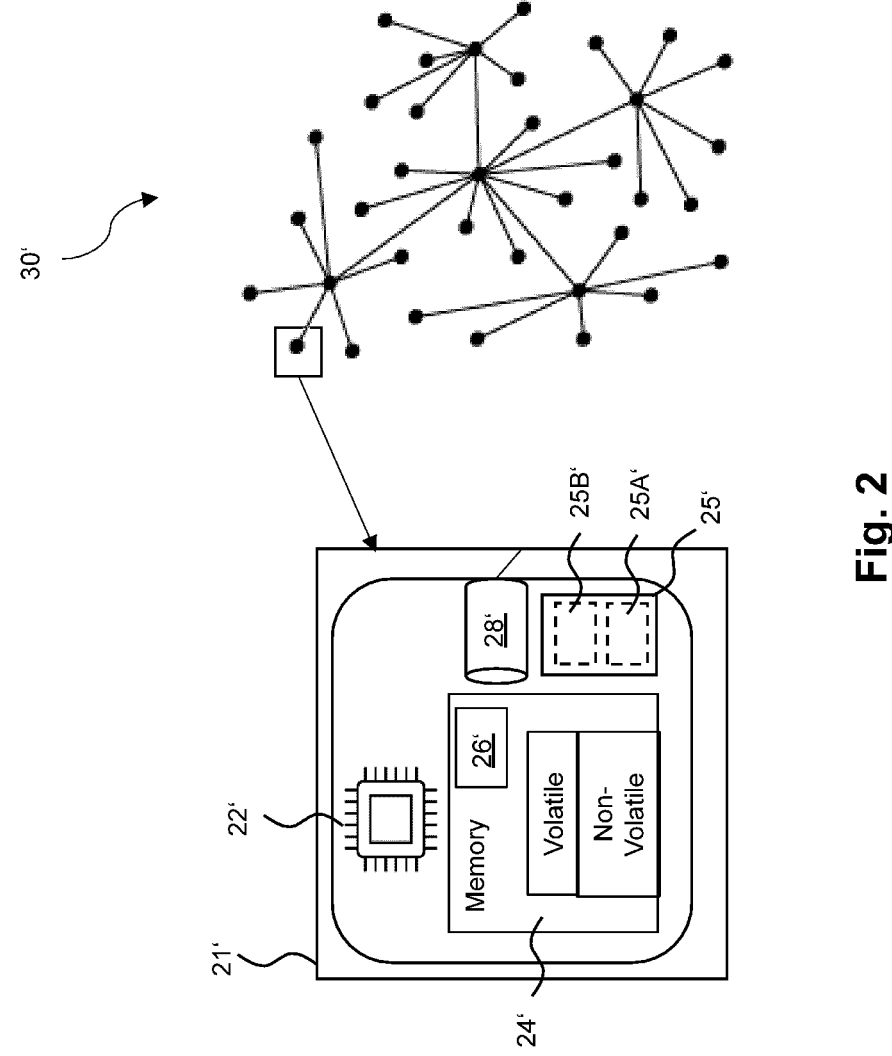
FIG. 2 illustrate example embodiments of a centralized and a decentralized computing environment with computing nodes.
Figure 3:
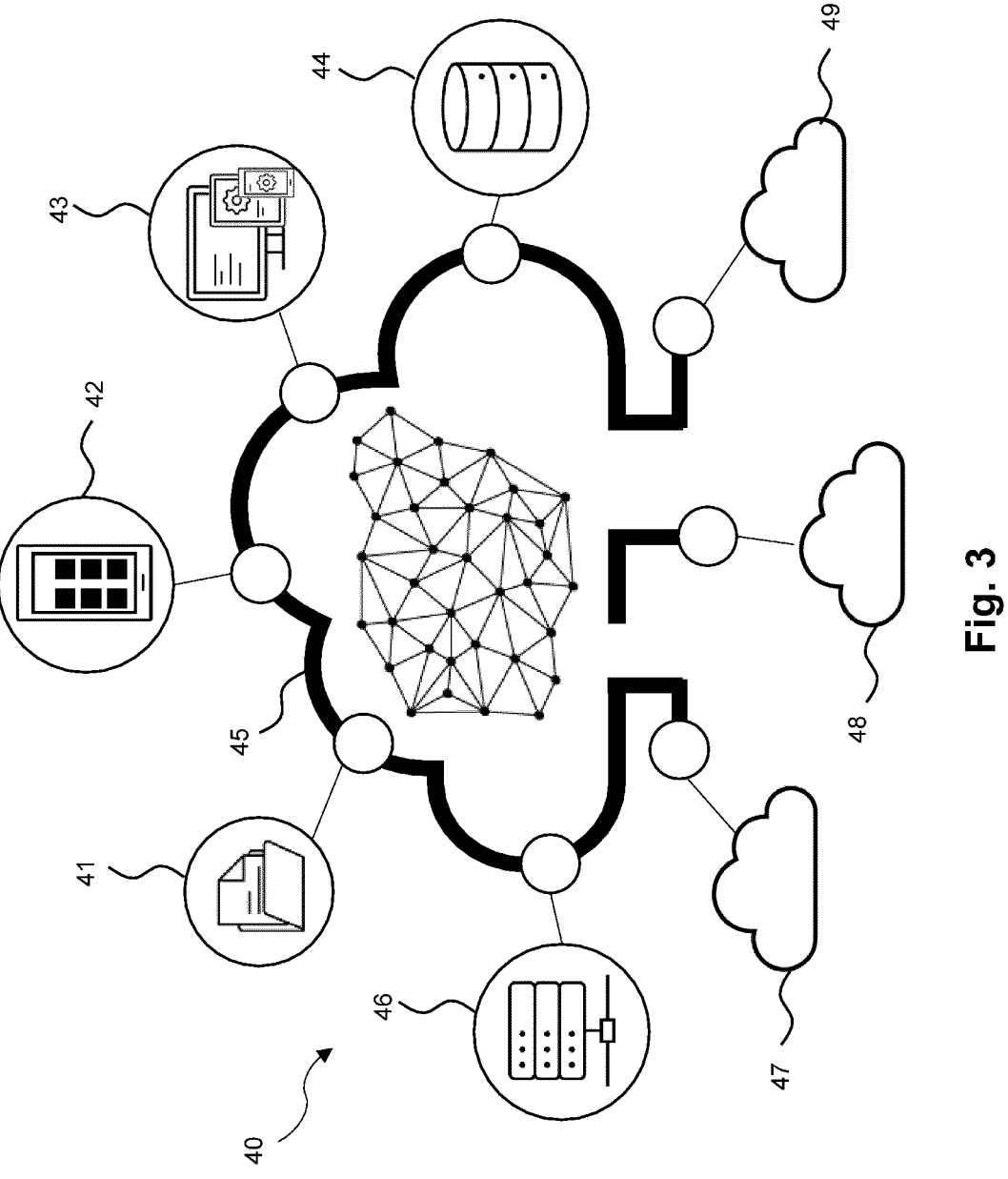
FIG. 3 illustrate an example embodiment of a distributed computing environment.

FIGS. 1 to 3 illustrate different computing environments, central, decentral and distributed. The methods, apparatuses, computer elements of this disclosure may be implemented in decentral or at least partially decentral computing environments. In particular, for data sharing or exchange in ecosystems of multiple players different challenges exist. Data sovereignty may be viewed as a core challenge. It can be defined as a natural person's or corporate entity's capability of being entirely self-determined with regard to its data. To enable this particular capability related aspects, including requirements for secure and trusted data exchange in business ecosystems, may be implemented across the chemical value chain. In particular, chemical industry requires tailored solutions to deliver chemical products in a more environmental friendly/sustainable way by using digital ecosystems. Providing, determining or processing of data may be realized by different computing nodes, which may be implemented in a centralized, a decentralized or a distributed computing environment.

FIG. 1 illustrates an example embodiment of a centralized computing system 20 comprising a central computing node 21 (filled circle in the middle) and several peripheral computing nodes 21.1 to 21.n (denoted as filled circles in the periphery). The term "computing system" is defined herein broadly as including one or more computing nodes, a system of nodes or combinations thereof. The term "computing node" is defined herein broadly and may refer to any device or system that includes at least one physical and tangible processor, and/or a physical and tangible memory capable of having thereon computer-executable instructions that are executed by a processor. Computing nodes are now increasingly taking a wide variety of forms. Computing nodes may, for example, be handheld devices, production facilities, sensors, monitoring systems, control systems, appliances, laptop computers, desktop computers, mainframes, data centers, or even devices that have not conventionally been considered a computing node, such as wearables (e.g., glasses, watches or the like). The memory may take any form and depends on the nature and form of the computing node.

In this example, the peripheral computing nodes 21.1 to 21.n may be connected to one central computing system (or server). In another example, the peripheral computing nodes 21.1 to 21.n may be attached to the central computing node via e.g. a terminal server (not shown). The majority of functions may be carried out by, or obtained from the central computing node (also called remote centralized location). One peripheral computing node 21.n has been expanded to provide an overview of the components present in the peripheral computing node. The central computing node 21 may comprise the same components as described in relation to the peripheral computing node 21.n.

Each computing node 21, 21.1 to 21.n may include at least one hardware processor 22 and memory 24. The term "processor" may refer to an arbitrary logic circuitry configured to perform basic operations of a computer or system, and/or, generally, to a device which is configured for performing calculations or logic operations. In particular, the processor, or computer processor may be configured for processing basic instructions that drive the computer or system. It may be a semi-conductor based processor, a quantum processor, or any other type of processor configures for processing instructions. As an example, the processor may comprise at least one arithmetic logic unit ("ALU"), at least one floating-point unit ("FPU)", such as a math coprocessor or a numeric coprocessor, a plurality of registers, specifically registers configured for supplying operands to the ALU and storing results of operations, and a memory, such as an L1 and L2 cache memory. In particular, the processor may be a multicore processor. Specifically, the processor may be or may comprise a Central Processing Unit ("CPU"). The processor may be a ("GPU") graphics processing unit, ("TPU") tensor processing unit, ("CISC") Complex Instruction Set Computing microprocessor, Reduced Instruction Set Computing ("RISC") microprocessor, Very Long Instruction Word ("VLIW") microprocessor, or a processor implementing other instruction sets or processors implementing a combination of instruction sets. The processing means may also be one or more special-purpose processing devices such as an Application-Specific Integrated Circuit ("ASIC"), a Field Programmable Gate Array ("FPGA"), a Complex Programmable Logic Device ("CPLD"), a Digital Signal Processor ("DSP"), a network processor, or the like. The methods, systems and devices described herein may be implemented as software in a DSP, in a micro-controller, or in any other side-processor or as hardware circuit within an ASIC, CPLD, or FPGA. It is to be understood that the term processor may also refer to one or more processing devices, such as a distributed system of processing devices located across multiple computer systems (e.g., cloud computing), and is not limited to a single device unless otherwise specified.

The memory 24 may refer to a physical system memory, which may be volatile, non-volatile, or a combination thereof. The memory may include non-volatile mass storage such as physical storage media. The memory may be a computer-readable storage media such as RAM, ROM, EEPROM, CD-ROM, or other optical disk storage, magnetic disk storage, or other magnetic storage devices, non-magnetic disk storage such as solid-state disk or any other physical and tangible storage medium which can be used to store desired program code means in the form of computer-executable instructions or data structures and which can be accessed by the computing system. Moreover, the memory may be a computer-readable media that carries computer-executable instructions (also called transmission media). Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing components that also (or even primarily) utilize transmission media.

The computing nodes 21, 21.1 to 21.*n* may include multiple structures 26 often referred to as an "executable component, executable instructions, computer-executable instructions or instructions". For instance, memory 24 of the computing nodes 21, 21.1 to 21.*n* may be illustrated as including executable component 26. The term "executable component" or any equivalent thereof may be the name for a structure that is well understood to one of ordinary skill in the art in the field of computing as being a structure that can be software, hardware, or a combination thereof or which can be implemented in software, hardware, or a combination. For instance, when implemented in software, one of ordinary skill in the art would understand that the structure of an executable component includes software objects, routines, methods, and so forth, that is executed on the computing nodes 21, 21.1 to 21.*n*, whether such an executable component exists in the heap of a computing node 21, 21.1 to 21.*n*, or whether the executable component exists on computer-readable storage media. In such a case, one of ordinary skill in the art will recognize that the structure of the executable component exists on a computer-readable medium such that, when interpreted by one or more processors of a computing node 21, 21.1 to 21.*n* (e.g., by a processor thread), the computing node 21, 21.1 to 21*n* is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component". Examples of executable components implemented in hardware include hardcoded or hard-wired logic gates, that are implemented exclusively or near-exclusively in hardware, such as within a field-programmable gate array (FPGA), an application-specific integrated circuit (ASIC), or any other specialized circuit. In this description, the terms "component", "agent", "manager", "service", "engine", "module", "virtual machine" or the like are used synonymous with the term "executable component.

The processor 22 of each computing node 21, 21.1 to 21.*n* may direct the operation of each computing node 21, 21.1 to 21.*n* in response to having executed computer-executable instructions that constitute an executable component. For example, such computer-executable instructions may be embodied on one or more computer-readable media that form a computer program product. The computer-executable instructions may be stored in the memory 24 of each computing node 21, 21.1 to 21.*n*. Computer-executable instructions comprise, for example, instructions and data which, when executed at a processor 21, cause a general purpose computing node 21, 21.1 to 21.*n*, special purpose computing node 21, 21.1 to 21.*n*, or special purpose processing device to perform a certain function or group of functions. Alternatively or in addition, the computer-executable instructions may configure the computing node 21, 21.1 to 21.*n* to perform a certain function or group of functions. The computer executable instructions may be, for example, binaries or even instructions that undergo some translation (such as compilation) before direct execution by the processors, such as intermediate format instructions such as assembly language, or even source code.

Each computing node 21, 21.1 to 21.*n* may contain communication channels 28 that allow each computing node 21.1 to 21.*n* to communicate with the central computing node 21, for example, a network (depicted as solid line between peripheral computing nodes and the central computing node in FIG. 1). A "network" may be defined as one or more data links that enable the transport of electronic data between computing nodes 21, 21.1 to 21.*n* and/or modules and/or other electronic devices. When information is transferred or provided over a network or another communications connection (either hardwired, wireless, or a combination of hardwired or wireless) to a computing node 21, 21.1 to 21.*n*, the computing node 21, 21.1 to 21.*n* properly views the connection as a transmission medium. Transmission media can include a network and/or data links which can be used to carry desired program code means in the form of computer-executable instructions or data structures and which can be accessed by a general-purpose or special-purpose computing nodes 21, 21.1 to 21.n. Combinations of the above may also be included within the scope of computer-readable media.

The computing node(s) 21, 21.1 to 21.n may further comprise a user interface system 25 for use in interfacing with a user. The user interface system 25 may include output mechanisms 25A as well as input mechanisms 25B. The principles described herein are not limited to the precise output mechanisms 25A or input mechanisms 25B as such will depend on the nature of the device. However, output mechanisms 25A might include, for instance, displays, speakers, displays, tactile output, holograms and so forth. Examples of input mechanisms 25B might include, for instance, microphones, touchscreens, holograms, cameras, keyboards, mouse or other pointer input, sensors of any type, and so forth.

FIG. 2 illustrates an example embodiment of a decentralized computing environment 30 with several computing nodes 21.1 to 21.n denoted as filled circles. In contrast to the centralized computing environment 20 illustrated in FIG. 1, the computing nodes 21.1 to 21.n of the decentralized computing environment are not connected to a central computing node 21 and are thus not under control of a central computing node. Instead, resources, both hardware and software, may be allocated to each individual computing node 21.1 to 21.n (local or remote computing system) and data may be distributed among various computing nodes 21.1 to 21.n to perform the tasks. Thus, in a decentral system environment, program modules may be located in both local and remote memory storage devices. One computing node 21 has been expanded to provide an overview of the components present in the computing node 21. In this example, the computing node 21 comprises the same components as described in relation to FIG. 1.

FIG. 3 illustrates an example embodiment of a distributed computing environment 40. In this description, "distributed computing" may refer to any computing that utilizes multiple computing resources. Such use may be realized through virtualization of physical computing resources. One example of distributed computing is cloud computing. "Cloud computing" may refer a model for enabling on-demand network access to a shared pool of configurable computing resources (e.g., networks, servers, storage, applications, and services). When distributed, cloud computing environments may be distributed internationally within an organization and/or across multiple organizations. In this example, the distributed cloud computing environment 40 may contain the following computing resources: mobile device(s) 42, applications 43, databases 44, data storage and server(s) 46. The cloud computing environment 40 may be deployed as public cloud 47, private cloud 48 or hybrid cloud 49. A private cloud 47 may be owned by an organization and only the members of the organization with proper access can use the private cloud 48, rendering the data in the private cloud at least confidential. In contrast, data stored in a public cloud 48 may be open to anyone over the internet. The hybrid cloud 49 may be a combination of both private and public clouds 47, 48 and may allow to keep some of the data confidential while other data may be publicly available.

Figure 4:
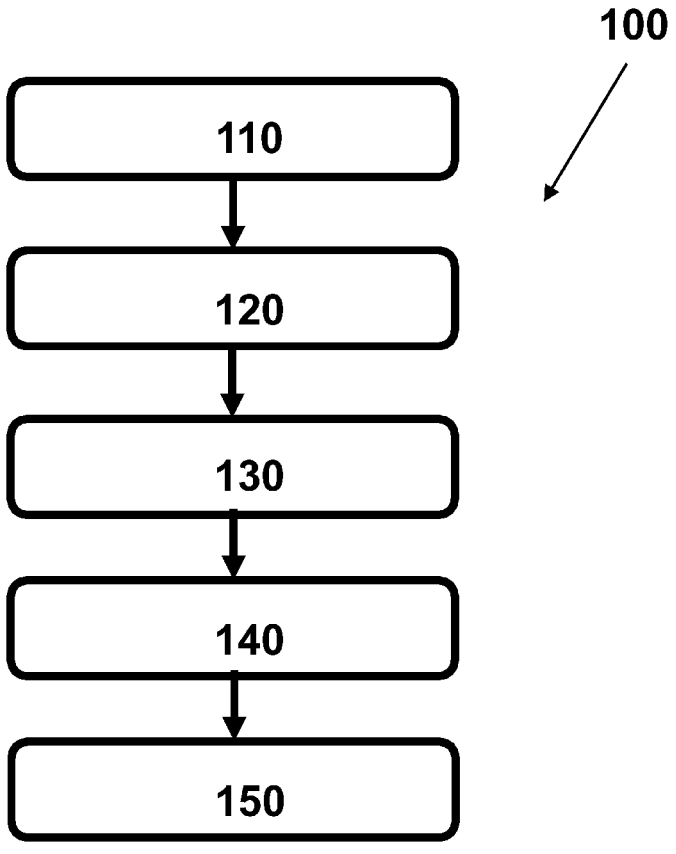
FIG. 4 is a flowchart that illustrates a computer-implemented method for selecting of one or more chemical precursors for producing a product according to some embodiments of the present disclosure.

FIG. 4 is a flowchart that illustrates an example of a computer-implemented method 100 according to an aspect of the present disclosure.

A solution should aim to (a) provide multi-objective Pareto optimization of economic benefit versus a set of impact reduction metrics for a set of alternative economic decisions and (b) quantitative ranking of alternative suppliers' offers. The ranking results are communicated to competing suppliers to provide reliable actionable incentives for environmental impact reduction and improved reliability of data.

The method comprises the step of (a) receiving 100, from an interface, at least two data sets containing material data related to chemical or physical properties of the one or more chemical precursors and environmental impact metrics data for one or more chemical precursors necessary for manufacturing the product.

The method comprises the step of (b) providing 110 an environmental impact calculation model describing a functional relationship between the material data and environmental impact metrics data.

The method comprises the optional step of (c) retrieving 120, from a database, historical environmental impact metrics data for the one or more chemical precursors, the data specification information comprising historic environmental impact metrics corresponding to the one or more chemical precursors.

The method comprises the step of (d) ranking 130 the at least two data sets by a distance from predefined minimum values in multiple dimensions of the environmental impact calculation model and generating thereon based ranking results;

The method comprises the step of (e) optionally obtaining 140 a degree of matching between the environmental impact calculation model and the data specification information and generating thereon based matching results.

The method comprises the step of (f) selecting 150 one or more chemical precursors out of a plurality of chemical precursors based on the ranking results and/or the matching results and adding 160 the selected one or more chemical precursors to a production process of the product.

In the circular economy, environmental impact will become the third pillar of product offer evaluation, next to price/cost and product application performance or product composition for bulk chemicals.

Already, customers increasingly insist on transparent and certified environmental product information for selected products. Once information requests will be received, data platforms for automated product data sharing will have to be put in place.

At this stage of scale out, automated vetting and improving of supplier input data will become a key capability to improve competitiveness in the environmental information dimension.

Customers indicated that environmental impact data may become part of supplier certification so that failure to comply may disqualify a company from a bidding process. Therefore, reliable environmental data could be a factor to protect existing business and new markets.

An example application may be provided by a Pareto optimization of chemical formulations along the dimensions of cost, product performance, and environmental impact reduction with product composition and processing parameters as free variables.

Environmental Impact Calculation Model

In step 110, an environmental impact calculation model is provided. The environmental impact calculation model associates a set of design parameters with a plurality of objective parameters that represent design characteristics of a system.

In an example, the environmental impact calculation model may comprise a linear model. Alternatively, the environmental impact calculation model may comprise a nonlinear model including at least one dimension reduction step.

Examples of the linear or nonlinear model may include, but are not limited to, linear regression;

principal component regression;

partial least squares regression;

ridge regression;

a lasso model;

a model whose mathematical form is given by polynomials;

a model whose mathematical form is given by a linear combination of arbitrary ansatz functions, such as, but not limited to, sine and cosine functions as appearing in Fourier Series, exponential functions as appearing as basis for complete monotonic functions, Gaussian Functions, Bessel Functions, Spherical Harmonics, logarithmic functions, rational functions, etc. or any algebraic expression formed from these functions;

a model whose mathematical form is given by polynomials of first or second order;

a model whose mathematical form is given by polynomials whose coefficients are determined by at least one of the following algorithms: linear regression, principal component regression, partial least square regression, ridge regression, lasso or any combination thereof;

a model whose mathematical form is given by polynomials of first or second order whose coefficients are determined by at least one of the following algorithms: linear regression, principal component regression, partial least square regression, ridge regression, lasso or any combination thereof;

a model whose mathematical form is given by a linear combination of arbitrary ansatz functions, such as, but not limited to, sine and cosine functions as appearing in Fourier Series, exponential functions as appearing as basis for complete monotonic functions, Gaussian Functions, Bessel Functions, Spherical Harmonics, logarithmic functions, rational functions, etc. or any algebraic expression formed from these functions, whose coefficients are determined by at least one of the following algorithms: linear regression, principal component regression, partial least square regression, ridge regression, lasso or any combination thereof;

any kind of parametric model, such as, but not limited to, polynomial regression models and neural network models;

a nonparametric models, such as, but not limited to, Spline Interpolation, Gaussian Process Models, Multivariate Adaptive Regression Spline, Kernel Regression;

any model, including any one of the explicit possibilities above, built on a previous dimension reduction step, such as, but not limited to, Feature selection, Feature projection, Feature extraction, Principal component analysis (PCA), Non-negative matrix factorization, Kernel PCA, Graph-based kernel PCA, Linear discriminant analysis, Generalized discriminant analysis, Autoencoder, T-distributed Stochastic Neighbour Embedding, Uniform manifold approximation and projection, K-nearest neighbors algorithm, canonical-correlation analysis, low-dimensional embedding, fast approximate K-NN search, locality sensitive hashin, random projection, Multilinear subspace learning, Multilinear principal component analysis, Multilinear independent component analysis, Multilinear linear discriminant analysis, Multilinear canonical correlation analysis, Independent component analysis, Isomap, Kernel PCA, Latent semantic analysis, Partial least squares, Principal component analysis, Multifactor dimensionality reduction, Nonlinear dimensionality reduction, Multilinear Principal Component Analysis, Multilinear subspace learning, Semidefinite embedding, Autoencoder;

any model based on any of the above listed techniques applied on an experimental data set;

any model based on any of the above listed techniques applied on an experimental data set generated by a Design of Experiments approach, such as, but not limited to full factorial designs, fractional factorial designs, D-Optimal designs; or a model defined by combinations and/or functions and/or chains of the models, functions, and/or algorithms listed above.

In the following, $x_1, x_2, \ldots, x_n$ represent the set of design parameters of the considered environmental impact calculation model, also called system model in the following. The set of design parameters may be e.g. original control and/or input parameters of the considered system.

Further, $y_1, y_2, \ldots, y_k$ represent the plurality of objective parameters of the considered system model. Examples of the objective parameters may be e.g. response and target variables of interest.

The range of the design parameters, i.e. input variables, is typically limited by a set of constrains. Both linear and nonlinear functions may be covered. Typically, but not limited to this case, we consider linear constrains of at least one of the following forms:

$$al_1 \cdot x_1 + al_2 \cdot x_2 + \ldots + al_n \cdot x_n > cl; \qquad \text{(a)}$$

$$al_1 \cdot x_1 + al_2 \cdot x_2 + \ldots + al_n \cdot x_n < cl; \text{ or} \qquad \text{(b)}$$

$$al_1 \cdot x_1 + al_2 \cdot x_2 + \ldots + al_n \cdot x_n = cl. \qquad \text{(c)}$$

The coefficients al and cl are arbitrary numbers. Typically, but not restricted to this case, the defined constrains may encode prior knowledge of a system expert, and may be based, but not limited to, both on practical experience and theoretical considerations such as fundamental, empirical, or semi-empirical physical, chemical, or technical formulas.

Further, $z_1, z_2, \ldots, z_m$ with m<n represent a set of "latent variables", such as, but not limited to, results from a principal components analysis (PCA) based on $x_1, \ldots, x_n$, or latent variables of a partial least squares (PLS) regression model connecting $x_1, \ldots, x_n$, and $y_1, \ldots, y_k$ via the latent variables $z_1, \ldots, z_m$.

We assume a validated model, such as, but not limited to, a PCA or PLS regression, that can with sufficiently accuracy predict $y_1, \ldots, y_k$ from $x_1, \ldots, x_n$ via $z_1, \ldots, z_m$:

$$x_1, \ldots, x_n => z_1, \ldots, z_m => y_1, \ldots, y_k.$$

Generalizations to arbitrary nonlinear models including a dimension reduction steps shall also be covered, such as, but not limited to auto-encoders, neural networks, and the like.

The system model may comprise at least one of the following models.

A. Chemical Formulations

In an example, the system model may be used to model chemical formulations, e.g. for predicting the properties of a chemical mixture. Examples of the chemical mixture may include, but are not limited to, paint formulation, agricultural multi-component mixture, pharmaceutical multi-component mixture, nutrition multi-component mixture, ink multi-component mixture, chemical mixture for construction purposes, and chemical mixture used inside oil production.

The design parameters, i.e. input variables, of the model for predicting the properties of a chemical mixture may include chemical mixture recipes having two or more ingredients. In some examples, a single chemical mixture recipe may comprise up to fifty different raw materials, i.e. ingredients. The two or more ingredients are expressed as fractional concentrations of the total amount of the chemical mixture. In general, the property of a chemical mixture depends on the ingredient component fractional concentrations rather than the total amount of the chemical mixture. Mixture formulas may be expressed in weight, volume, or other quantity units, such as the relative concentration of reactive groups per monomer type if mixtures of monomers with different amount of functional groups per monomer are considered. The fractional concentration is simply the quantity of an ingredient in the chemical mixture divided by the total quantity of the mixture. The sum of the fractional concentrations will be unity. Fractional concentrations are continuous variable in the range between 0 and 1.

Many times the properties of mixtures depend on process conditions in addition to the mixture components. For example, environmental variables may influence a property measurement. In the coating example, the temperature of the mixture during measurement can influence the measurement of viscosity. Therefore, process variables, such as temperature, may also be included as a design parameter.

The plurality of objective parameters of the model for predicting the properties of a chemical mixture may comprise properties of the chemical mixture. Properties of the chemical mixture may be any measurable characteristic. The characteristic may be a continuous, ordinal, or nominal measurement. For example, a formulated coating could have a measurement of the viscosity of the liquid mixture on a continuous scale. For example, the measurement of orange peel of the applied coating film may be on a decimal category ordinal scale from 1 (very unsmooth) to 10 (very smooth). In another example, the properties of each chemical mixture recipe further comprise, for each measured property, a respective performance score indicative of a performance evaluation of the respective chemical mixture recipe, e.g. from 1 (very good) to 5 (very bad). An example of a nominal measurement may be the coded categories of pass or fail for observation of some defect.

In the following, exemplary design parameters (e.g. raw materials) and exemplary objective parameters (e.g. properties) for various chemical mixtures will described.

1. Agricultural Multi-Component Mixtures

For example, there are mixtures used for agricultural purposes like formulations used as sprays for treating crops with insecticides, fungicides and so on. Thereby on the one side the sprayability of the active ingredients is guaranteed by the residual components inside the formulation. I.e. the different other components of the formulation besides the active ingredient are used to obtain a formulation, which is applicable under the given process of spraying. I.e. the sprayability (e.g. droplet size formation, ease of forming such a droplet and so on) might be properties, which are influenced by the different components of such a formulation together with the nature of the active ingredient.

Furthermore, also the adsorption of the sprayed formulation on the plant and the absorption, which is resorption in this context, of the active ingredient or complete sprayed formulation are depending on the active ingredient and the residual components in the formulation. Moreover, also the target-oriented way—or better said movement of the active ingredient to the targeted part of the cell—of the active ingredient inside a plant/organism will be influenced by the residual components inside such a formulation. I.e. the speed of effect generation and the effect generation itself are depending on these shares of the formulation.

2. Pharmaceutical Multi-Component Mixtures

Also, here the components being present in a pharmaceutical formulation besides the active ingredient influence the complete lifecycle of such a pharmaceutical—herein, from preparation to excretion or "digestion".

For example, these formulation shares define, whether an active ingredient is provided as pill, suppositories or as a liquid, which mostly is a dispersion of the active ingredient.

Furthermore, these formulation shares define, where inside an organism the active ingredient is set free and where it can be absorbed respectively resorbed.

Finally, these formulation shares define, to which parts inside a body respectively cell the active ingredient is transported and there digested to show the wished effect; or, if it is not "digested" inside the organism at all and excreted without "digestion".

Each of these properties may be important to find the right formulation, i.e. composition of the pharmaceutical multi-component mixtures.

3. Nutrition Multi-Component Mixtures

Many foods can be looked at as multi-component mixtures comprising different kind of chemical sub-groups necessary for our organisms to work properly. Nutrition additives like e.g. vitamins, mineral nutrients and so on are a part of foods also, whereby it is important to integrate these into these food "formulations" in a way that these are available at the right parts of the organism. Again, both parameters can be influenced by the residual shares of the food "formulations". For example, the right way of offering mineral nutrients to an organism can guarantee a good resorption by the organism, whereas a worse way of offering can reduce the resorption, what then can cause health effects.

4. Inks as Multi-Component Mixtures

Similar, inks are also multi-component mixtures, i.e. they can be defined as ink formulations also. Also, here the residual components beside the colour providing ingredients—in this case mostly dyes—guarantee the stability of the ink, the process-ability and the fixation on the to-be-inked surface.

Here, the properties being of specific importance, are properties like adhesion to the to-be-inked surface, sagging resistance or viscosity stability of the formulation after application and lightfastness of the resulting print, i.e. non-fading of the resulting print.

5. Chemical Mixtures for Construction Purposes

Also, a lot of materials used inside construction applications can be looked at as chemical mixtures. E.g. concrete is formed out of a mixture of cement, rockets of different sizes and water. Furthermore, a modern concrete formulation also contains concrete additions and concrete admixtures, both, additives for these formulations to trigger and tailor-make specific properties of the concrete formulations. Such properties are for example the application behaviour, the settling behaviour, the hardening, the tensile strength, the bending property and the durability of the concrete in wet or in dried form. All these properties can be influenced by concrete additions and concrete admixtures. Whereas the substances used as concrete addition materials are mostly inorganics like e.g. rock flour, fly ash or silica fume, the substances used as concrete admixture materials can also be of organic character, like e.g. acrylics or other oligo- or polymeric substances.

A related application may also be chemical mixtures used as materials for plastering. Thereby, also formulations are used, which are similar to concrete formulations. However, these plaster mortars are usually limited with respect to the size of the rockets. I.e. the rock's aggregate is limited to a size of 4 mm, no bigger sizes are allowed to be used for these mortars. The main properties, which need to be achieved also by the use of the right additives, which are very similar to the ones mentioned above, are mainly in the area of application properties respectively workability. Pumpability, smoothing property, but also adhesion properties are evaluated usually during the development of such plastering formulations.

6. Chemical Mixtures Used Inside Oil Production

Also, in oil production chemical mixtures are used to optimize the degree of efficiency of oil extraction. In fracking and in conventional oil extraction methods, especially at late stages of the lifecycle of a wellbore, the efficiency level is elevated by pumping of these formulations into the wellbore. Thereby, mainly water comprising organic polymers are used. Overall, the efficiency level of oil production is a parameter for the effectiveness of the additives used. In a detail view, properties like the ability to release oil from stones or the ability to generate pressure and viscosity under such conditions might be important properties.

B. Chemical Processes

In an example, the model may be used for modelling chemical processes.

Using the industrial aging processes as an example, aging of critical assets is an omnipresent phenomenon in any production environment, causing significant maintenance expenditures or leading to production losses. The understanding and anticipation of the underlying degradation processes is therefore of great importance for a reliable and economic plant operation, both in discrete manufacturing and in the process industry.

With a focus on the chemical industry, notorious aging phenomena include the deactivation of heterogeneous catalysts due to coking, sintering, or poisoning; plugging of process equipment, such as heat exchangers or pipes, on process side due to coke layer formation or polymerization; fouling of heat exchangers on water side due to microbial or crystalline deposits; erosion of installed equipment, such as injection nozzles or pipes, in fluidized bed reactors; and more.

This understanding has commonly been condensed into sophisticated mathematical models. Examples of such mechanistic degradation models deal with coking of steam-cracker furnaces, sintering or coking of heterogeneous catalysts, or crystallization fouling of heat exchangers.

In this example, the design parameters may thus include various process variables, such as temperature, flow rate, pressure, etc., while the objective parameters may include one or more key performance indicators for quantifying the progress of its degradation.

One skilled in the art would understand that the method of the present disclosure is also applicable for other system models, such as logistics system model, energy system models, engineering system models, etc.

Historical Environmental Impact Metrics

In step 120, i.e. step c), historical environmental impact metrics data for the one or more chemical precursors is received, the data specification file comprising historic environmental impact metrics corresponding to the one or more chemical precursors.

For example, in chemical process design historic environmental impact metrics may be measured and stored in a database. The first group may contain, e.g. product purities, column duties, and reboil ratios.

The present disclosure as defined by the method for selecting of one or more chemical precursors for producing a product, for example uses historical time series of as available from the GHG Protocol, Greenhouse Gas Protocol, and product and process properties data as derived from data on product carbon footprint but also of many other categories such as water consumption, for example given in kg/kg.

According to an exemplary embodiment of the present disclosure, the environmental impact reduction model is defined in such way that it calculates present impact reduction—given user input—against a reference value for each dimension derived from historic data of the user, industry average data—commercial databases—, regulatory guidelines and targets, and theoretical data—academic literature.

Multi-Objective Optimizing Process

According to an embodiment of the present disclosure, the environmental impact calculation model comprises at least one multi-criteria optimization algorithm.

As in any engineering problems or projects, these objective parameters and constraints are generally in conflict and interact with one another and the design parameters in nonlinear manners. Thus, it may be not very clear how to modify them to achieve the "best" design or trade off.

Typically, the multi-objective optimizing process may result in a set of optimal solutions that represent different trade-offs among objectives, i.e. objective parameters. These solutions are also referred to as Pareto optimal solutions or Pareto optimal solution set. Design objective function space representation of the Pareto optimal solution set is known as Pareto optimal front (POF). One strategy to find Pareto optimal solutions is to convert the multi-objective optimization problem to a single objective optimization problem and then find a single trade-off solution.

In an example, the multi-objective optimizing process is based on genetic algorithm, which has been demonstrated to efficiently solve multi-objective optimization problems because they result in diverse set of trade-off solutions in a single numerical simulation.

In an example, the multi-objective optimizing process is based on evolutionary algorithm, such as crossovers and/or mutations, which is used for creating future generations.

For example, in the above-described exemplary system model, a multicriterial optimization algorithm is applied to optimize the values of the above-mentioned optimization objectives $y_1, \ldots, y_k$. The found optimal values are denoted by $y_1^*, \ldots, y_k^*$. The individual objectives here may be minimizing, maximizing, or approaching a desired target value while satisfying one of the constrains under section "system model".

In an example, the multi-objective optimizing process is a Pareto optimization based on the sandwiching or the hyperboxing method as described in Bortz M, Burger J, Asprion N, Blagov S, Böttcher R, Nowak U, Scheithauer A, Welke R, Küfer K-H, Hasse H. Multi-criteria optimization in chemical process design and decision support by navigation on Pareto sets. *Computers and Chemical Engineering* 2014; 60:354-363.

In a further example, the selection of the Pareto optimal configuration from the pareto frontier is carried out by graphical navigation as described in Bortz M, Burger J, Asprion N, Blagov S, Böttcher R, Nowak U, Scheithauer A, Welke R, Küfer K-H, Hasse H. Multi-criteria optimization in chemical process design and decision support by navigation on Pareto sets. *Computers and Chemical Engineering* 2014; 60:354-363.

Optionally, the generated optimal design may result from a selection from a Pareto frontier by the decision maker. Accordingly, this step may further comprise the step of providing a user interface allowing a user to interactively navigate along the Pareto frontier based on the set of objectives and the step of determining a candidate design from designs calculated in response to the interactive navigation that fulfils the optimality conditions of the set of the objectives set by the user via the user interface. In other words, to support the decision maker, the data may be visualized in a user interface, which allows the decision maker to explore the Pareto set and its trade-offs between the different objectives by using graphical controls. For more information concerning visualizing the Pareto set, reference is made to Bortz M, Burger J, Asprion N, Blagov S, Böttcher R, Nowak U, Scheithauer A, Welke R, Küfer K-H, Hasse H. Multi-criteria optimization in chemical process design and decision support by navigation on Pareto sets. *Computers and Chemical Engineering* 2014; 60:354-363 and Küfer et al. Multicriteria optimization in intensity modulated radiotherapy planning. In P. M. Pardalos, & H. E. Romeijn (Eds), *Handbook of optimization in medicine* (pp. 1123-168), Springer.

Yielding a Degree of Matching and Ranking Results

In step 130, the processor determines and ranks the at least two data sets by a distance from predefined minimum values in all dimensions of the environmental impact calculation model and generating thereon based ranking results.

In step 140, the processor obtains a degree of matching between the at least two of i) economic data, ii) measured or calculated material property data, and iii) environmental impact metrics data of the at least two data sets and generating thereon based matching results.

Examples for a multi-objective optimizing process on the identified at least one parameterized system model may include, but are not limited to, an optional objective parameter, or an objective parameter used in means of a D-Optimal design to explore a maximal variability in the set of design parameters leading to the set of improved optimization objective parameters, or an objective parameter including at least one of a determinant, a trace, an eigenvalue, a condition number, or any norm derived from at least one of: a Fisher information Matrix, a transpose of the Fisher Information Matrix, an inverse of the Fisher Information Matrix, or any combinations thereof to be used in means of an optimal design to explore a maximal variability in the set of design parameters leading to the set of improved optimization objective parameters. For example, the optimal design may be preferentially in form of: A-Optimality, or C-Optimality, or D-Optimality, or E-Optimality, or T-Optimality, or G-Optimality, or I-Optimality, or V-Optimality. For example, the objective parameter used in means of a D-Optimal design may be the determinant of the Fisher Information Matrix.

Using drug formulations as an example, the set of optimization objective parameters may comprise one or more of melting point; permeability across biological or artificial lipid membranes; solubility in water, solvents, co-solvents and/or biorelevant media; miscibility with water, solvents, co-solvents and/or biorelevant media; true density; viscosity; wettability; interfacial and/or surface tension; particle size distribution data; particle morphology, shape and/or aspect ratio; bulk and tapped density; flowability (e.g., angle of repose or flow function coefficient); compressibility and compactibility; hygroscopicity; water content (e.g., loss on drying); concentration of impurities; hardness, chemical resistance, color stain resistance, glass transition temperature; other chemical, physicochemical and/or physical properties; and information on compatibility and stability. The set of optimization objective parameters may comprise one or more of cost, toxicity, and compatibility.

In a further exemplary embodiment of the present disclosure, in a further step, the multi-objective optimal design is provided via an output channel.

Optionally, the computer-implemented method may use an iterative approach to perform Pareto optimization.

Optionally, the computer-implemented method may use a parallel approach to perform Pareto optimization.

The basic idea is to use a sandwich approximation method which is able to approximate the convex part of the Pareto set efficiently. Once a certain approximation quality is achieved there, candidate regions for non-convex behavior are identified and tested for non-convexity. Finally, the non-convex regions are sampled using a hyperboxing scheme.

The sandwich approximation method creates successively inner and outer approximations to the Pareto set by using a weighted sum scalarization to calculate Pareto points. The weight vectors are the normals to the supporting, tangential hyperplanes of the Pareto set at the calculated points. These hyperplanes represent the outer approximation. The inner approximation is found from the close-by facets of the convex hull of the Pareto points.

New Pareto points are added as long as the difference between outer and inner approximation—the sandwich—is still beyond some arbitrary but fixed threshold, i.e. the desired approximation quality. The basic idea of approximation of the Pareto set is outlined above, details are published in Bortz M, Burger J, Asprion N, Blagov S, Böttcher R, Nowak U, Scheithauer A, Welke R, Küfer K-H, Hasse H. Multi-criteria optimization in chemical process design and decision support by navigation on Pareto sets. *Computers and Chemical Engineering* 2014; 60:354-363.

The result of the automated calculations of the hybrid algorithm is a finite set of points, which approximate the Pareto set within a certain accuracy.

It should also be understood that, unless clearly indicated to the contrary, in any methods claimed herein that include more than one step or act, the order of the steps or acts of the method is not necessarily limited to the order in which the steps or acts of the method are recited.

Multi-Objective Optimal Design Supporting Device

According to a second aspect of the present disclosure, there is provided a system 200 configured for facilitating purchase of one or more chemical precursors for use in the manufacturing of a product. The system 200 comprises one or more hardware processors 210-1, 210-2, . . . , 210-N configured by machine-readable instructions to carry out a method for selecting of one or more chemical precursors for producing a product.

Figure 5:
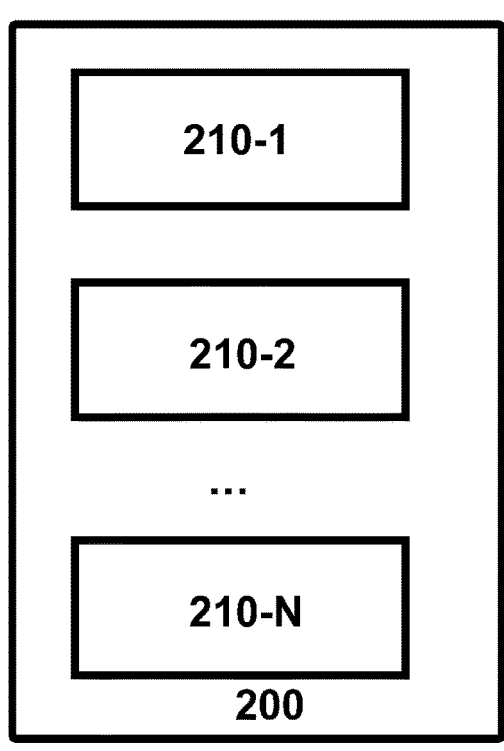
FIG. 5 is a flowchart that illustrates a computer-implemented method for selecting of one or more chemical precursors for producing a product according to some embodiments of the present disclosure.

FIG. 5 schematically illustrates an example of the system 200 according to the second aspect of the present disclosure. The system 200 may be implemented as an embedded computing device or on a personal computer, for example.

A skilled person will appreciate that the device is also applicable for a logistics system model, an energy system model, an engineering system model, and the like.

The system model may comprise a linear model or a nonlinear model including at least one dimension reduction step. Examples of the linear or nonlinear model may include, but are not limited to:

linear regression;

principal component regression;

partial least squares regression;

ridge regression;

a lasso model;

a model whose mathematical form is given by polynomials;

a model whose mathematical form is given by a linear combination of arbitrary ansatz functions, such as, but not limited to, sine and cosine functions as appearing in Forier Series, exponential functions as appearing as basis for complete monotonic functions, Gaussian Functions, Bessel Functions, Spherical Harmonics, logarithmic functions, rational functions, etc. or any algebraic expression formed from these functions;

a model whose mathematical form is given by polynomials of first or second order;

a model whose mathematical form is given by polynomials whose coefficients are determined by at least one of the following algorithms: linear regression, principal component regression, partial least square regression, ridge regression, lasso or any combination thereof;

a model whose mathematical form is given by polynomials of first or second order whose coefficients are determined by at least one of the following algorithms: linear regression, principal component regression, partial least square regression, ridge regression, lasso or any combination thereof;

a model whose mathematical form is given by a linear combination of arbitrary ansatz functions, such as, but not limited to, sine and cosine functions as appearing in Forier Series, exponential functions as appearing as basis for complete monotonic functions, Gaussian Functions, Bessel Functions, Spherical Harmonics, logarithmic functions, rational functions, etc. or any algebraic expression formed from these functions, whose coefficients are determined by at least one of the following algorithms: linear regression, principal component regression, partial least square regression, ridge regression, lasso or any combination thereof;

any kind of parametric model, such as, but not limited to, polynomial regression models and neural network models;

a nonparametric models, such as, but not limited to, Spline Interpolation, Gaussian Process Models, Multivariate Adaptive Regression Spline, Kernel Regression;

any model, including any one of the explicit possibilities above, built on a previous dimension reduction step, such as, but not limited to, Feature selection, Feature projection, Feature extraction, Principal component analysis (PCA), Non-negative matrix factorization, Kernel PCA, Graph-based kernel PCA, Linear discriminant analysis, Generalized discriminant analysis, Autoencoder, T-distributed Stochastic Neighbor Embedding, Uniform manifold approximation and projection, K-nearest neighbors algorithm, canonical-correlation analysis, low-dimensional embedding, fast approximate K-NN search, locality sensitive hashin, random projection, Multilinear subspace learning, Multilinear principal component analysis, Multilinear independent component analysis, Multilinear linear discriminant analysis, Multilinear canonical correlation analysis, Independent component analysis, Isomap, Kernel PCA, Latent semantic analysis, Partial least squares, Principal component analysis, Multifactor dimensionality reduction, Nonlinear dimensionality reduction, Multilinear Principal Component Analysis, Multilinear subspace learning, Semidefinite embedding, Autoencoder;

any model based on any of the above listed techniques applied on an experimental data set;

any model based on any of the above listed techniques applied on an experimental data set generated by a Design of Experiments approach, such as, but not limited to full factorial designs, fractional factorial designs, D-Optimal designs; or a model defined by combinations and/or functions and/or chains of the models, functions, and/or algorithms listed above.

Figure 6:
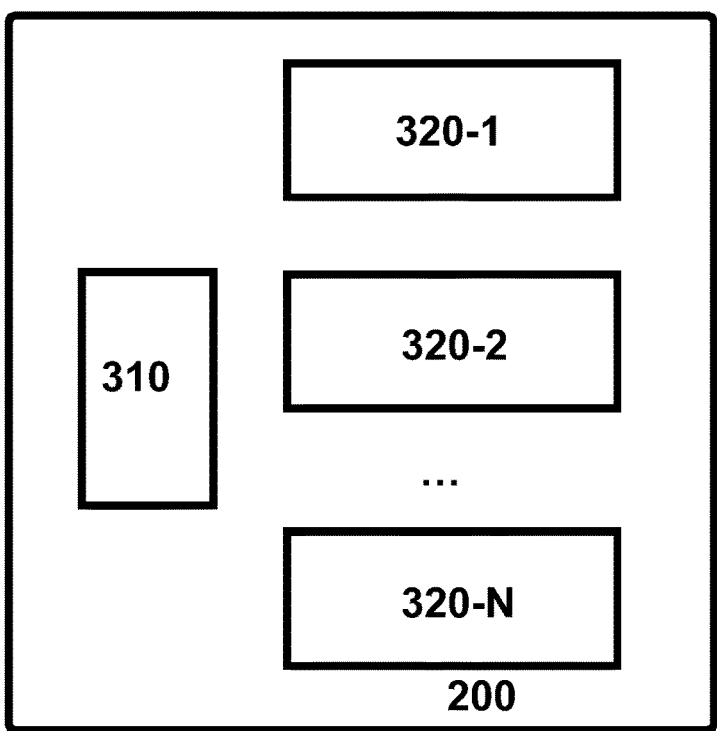
FIG. 6 is a schematic drawing of a device or a platform for selecting of one or more chemical precursors for producing a product according to some embodiments of the present disclosure.

FIG. 6 is a schematic drawing of a device or a platform for selecting of one or more chemical precursors for producing a product according to some embodiments of the present disclosure.

A computing platform 300 is configured for facilitating purchase of one or more chemical precursors for use in the manufacturing of a product.

The computing platform 300 comprises a non-transient computer-readable storage medium 310 having executable instructions embodied thereon to carry out the method for selecting of one or more chemical precursors for producing a product.

The computing platform 300 comprises one or more hardware processors 320-1, 320-2, ..., 320-N configured to execute the instructions embodied in the non-transient computer-readable storage medium.

Figure 7:
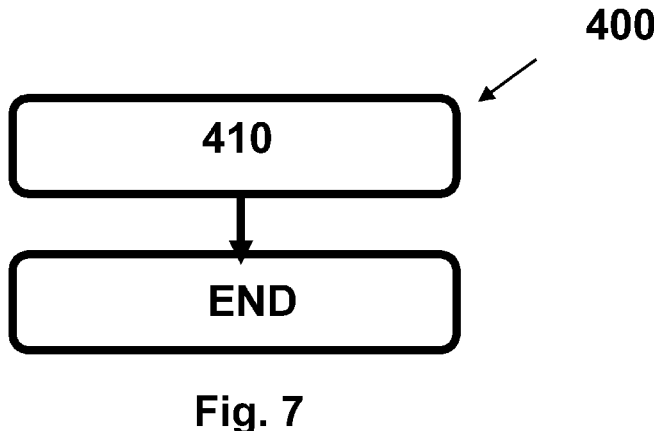
FIG. 7 is a flowchart that illustrates a computer-implemented method for producing a chemical product from chemical precursors according to some embodiments of the present disclosure.

FIG. 7 is a flowchart that illustrates a computer-implemented method according to some embodiments of the present disclosure.

The method 400 for production of a chemical product from chemical precursors comprises the step of producing 410 the chemical product from the chemical precursors using during the production process the ranking results and/or the matching results of the method for selecting of one or more chemical precursors for producing a product.

Notably, for producing a chemical product, raw materials may be provided as physical inputs. The raw materials may comprise precursor materials. The raw materials may include virgin or recycled materials. The raw materials may be associated with a decentral identifier. The decentral identifier may be associated with a digital twin of the raw materials. The decentral identifier may be associated with raw materials data such as a tag for virgin or recyclate material, material properties related to their environmental impact or material properties associated with their origin.

The production of a chemical product may comprise a two-step process: 1) production of precursor material, 2) production of the chemical product. To produce the precursor material, the raw materials may be used as physical inputs. The operating system of the precursor production may access data related to the raw materials based on the decentral identifier e.g. from a raw materials provider. Such data may be used to operate the production. For instance, if the raw materials are recycled materials, production steps purifying the recyclate may be comprised. For instance, if the raw materials are virgin materials, purification steps may be omitted. The precursor material may be formed by co-precipitating the raw materials. Production data from precursor production may be stored and/or associated with a decentral identifier.

In a second step, the precursor material may be provided to produce the chemical product. The precursor material may comprise the precursor produced by the precursor production. The precursor material may comprise recycled precursor material or precursor material produced by a different entity. Such precursor material may be associated with a decentral identifier via which data related to the precursor material may be accessible.

The produced and packaged chemical product may be assigned to a decentral identifier and associated information as lined out above. The packaged electrode active material may, for instance, comprise the physical identifier element, such as a QR-Code, physically attached to the package. Such physical identifier element may be assigned to the decentral identifier. The assignment of physical identifier element and decentral identifier may be executed through an ID generator/assignor running locally, in a decentral system and/or in a distributed system.

Figure 8:
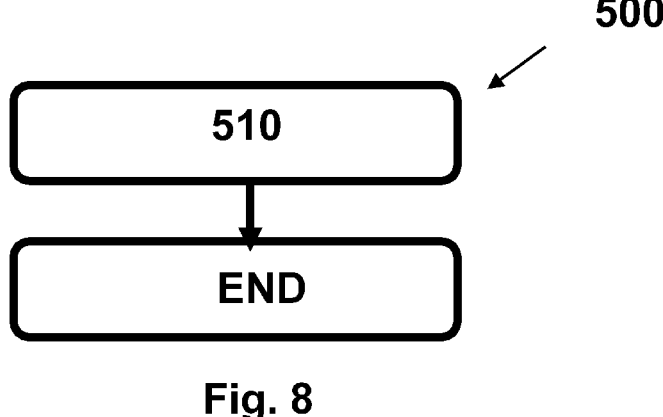
FIG. 8 is a flowchart that illustrates a computer-implemented method for selecting of one or more chemical precursors for producing a product according to some embodiments of the present disclosure.

FIG. 8 is a flowchart that illustrates a computer-implemented method for selecting of one or more chemical precursors for producing a product according to some embodiments of the present disclosure.

The method 500 for selecting one or more precursors for producing a chemical product comprises the step of selecting 510 the one or more precursors for producing the chemical product using the ranking results and/or the matching results of the method for selecting of one or more chemical precursors for producing a product.

Figure 9:
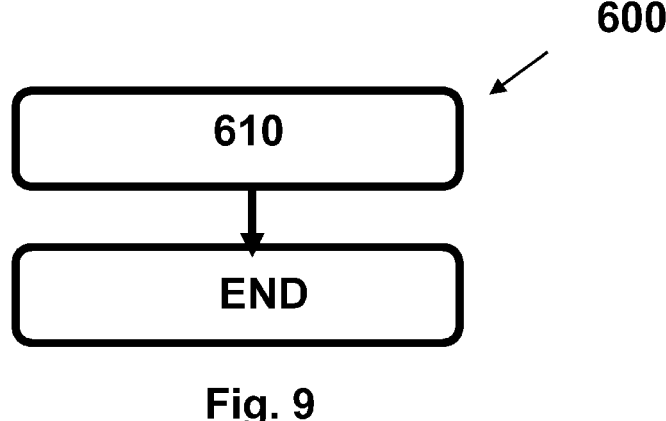
FIG. 9 is a flowchart that illustrates a computer-implemented method for selecting of one or more chemical precursors for producing a product according to some embodiments of the present disclosure.

FIG. 9 is a flowchart that illustrates a computer-implemented method for selecting of one or more chemical precursors for producing a product according to some embodiments of the present disclosure.

The method 600 for selecting one or more precursors for producing a chemical product comprises the step of selecting 610 the one or more precursors for producing the chemical product using the ranking results and/or the matching results of the method for selecting of one or more chemical precursors for producing a product.

Figure 10A:
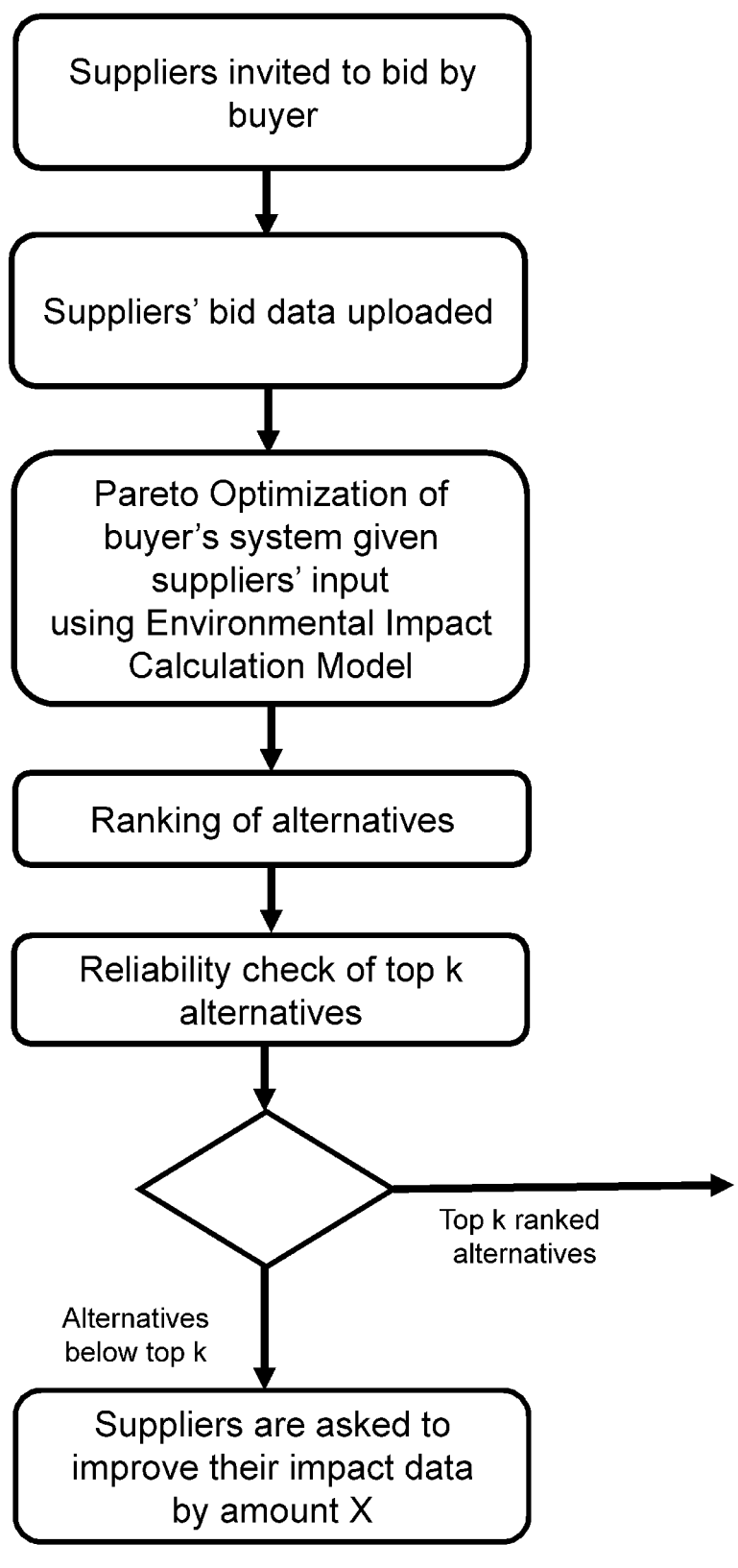
FIG. 10A is a flowchart that illustrates a computer-implemented method for buyer's procurement process for selecting of one or more chemical precursors for producing a product according to some embodiments of the present disclosure.
Figure 10B:
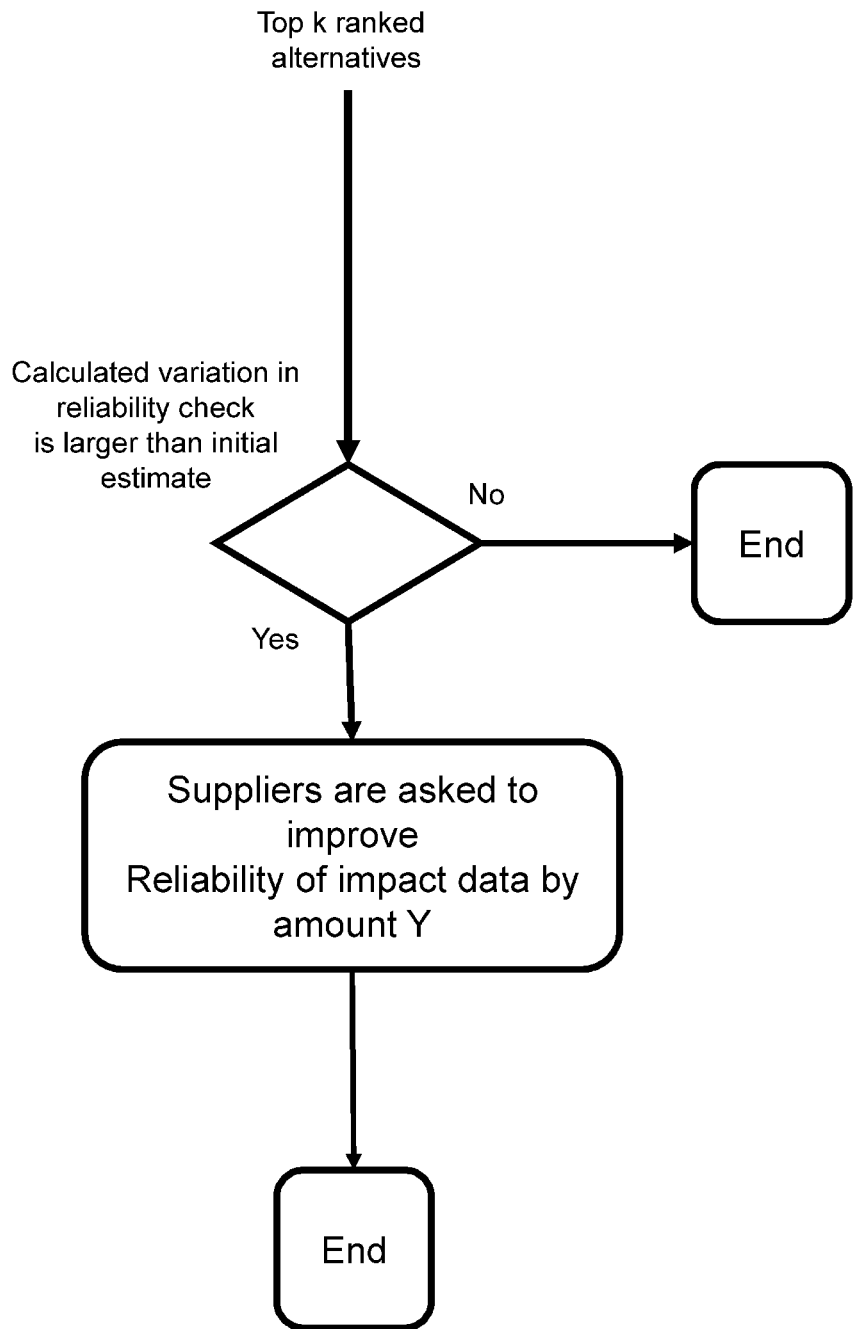
FIG. 10B is a flowchart that illustrates a computer-implemented method for buyer's procurement process for selecting of one or more chemical precursors for producing a product according to some embodiments of the present disclosure.

FIG. 10A is a flowchart that illustrates a computer-implemented method for selecting of one or more chemical precursors for producing a product according to some embodiments of the present disclosure. The process continues on FIG. 10B which is a flowchart that illustrates a computer-implemented method for selecting of one or more chemical precursors for producing a product according to some embodiments of the present disclosure (i) From the buyer's perspective, the process starts with the procurement process where suppliers are invited to bid on a tender.

(ii) Suppliers' bid data on price, product properties, and environmental impact metrics are loaded into the calculation module that executes an environmental impact calculation model (e.g., life cycle inventory and life cycle analysis).

(iii) The module executes a Pareto optimization algorithm for each alternative. It calculates optimal economic benefit and environmental impact reductions by manipulating free system variables for each alternative taking product properties into account (such as a process model that allows variation of mass and energy flows in operations). Each impact reduction is calculated against the average impact data of a historic planning period.

Figure 11:
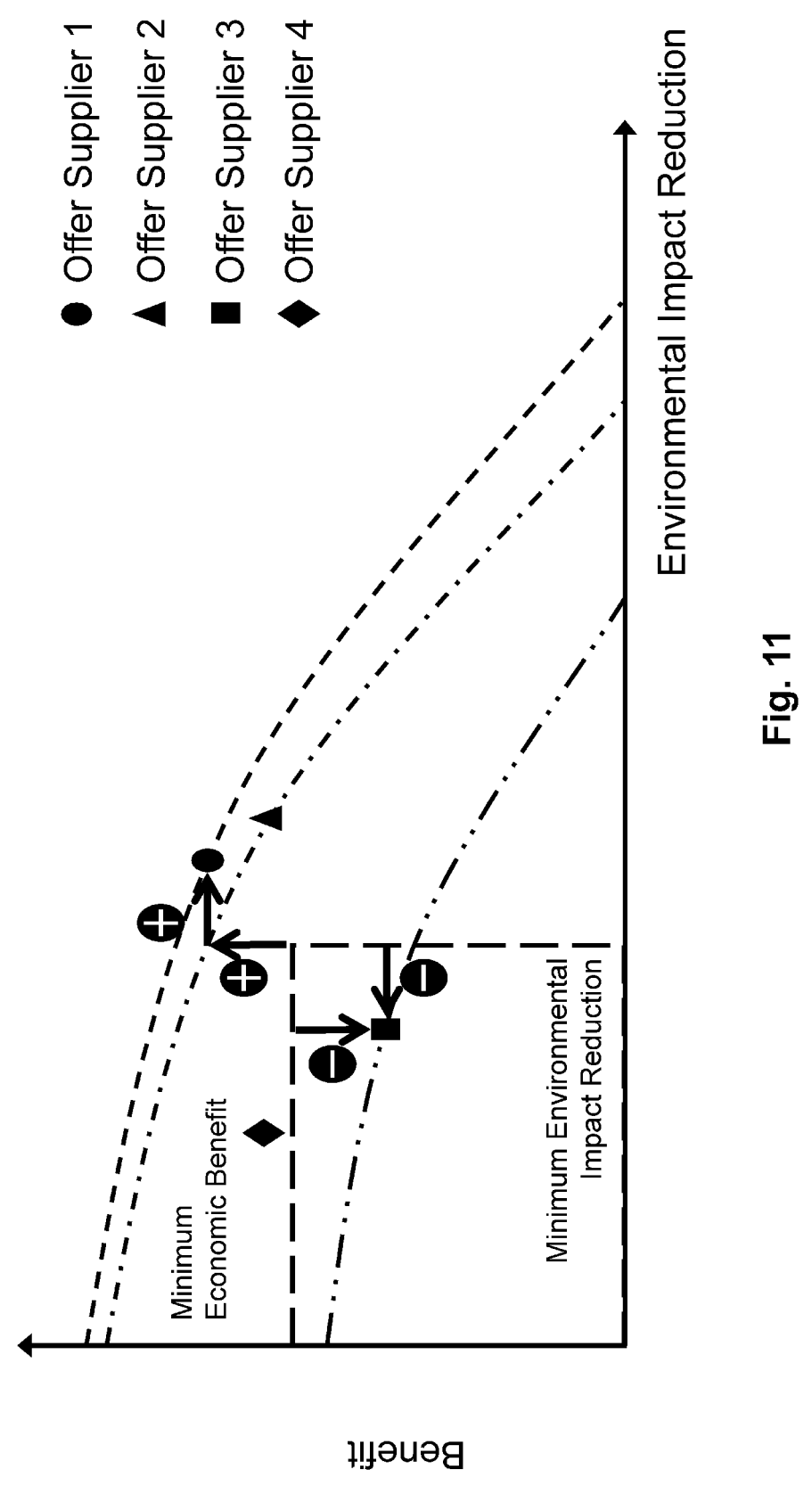
FIG. 11 is a flowchart that illustrates a distance based ranking of alternative decision options according to some embodiments of the present disclosure.

(iv) Alternative results are ranked by their distance from user defined minimum values in all dimensions, measured by any monotonic norm, e.g., L1. see in this regard FIG. 11.

(v) Reliability check for the top k ranked alternatives: the supplier impact data is varied by a margin in undesired direction until their ranking falls by one place. Initial variation is estimated from statistical comparison to commercially available average data.

(vi) The results are communicated to the respective suppliers:

A) Top k ranked suppliers: If calculated variation in reliability check is larger than initial estimate supplier is asked to improve reliability of impact data by at least difference between calculated and initially estimated variation. (Parameter k is user defined.)

B) Suppliers ranked below top k: Suppliers are asked to improve their impact data by difference to average of top k ranked alternatives, see in this regard FIG. 12.

FIG. 11 is a flowchart that illustrates a distance-based ranking of alternative decision options according to some embodiments of the present disclosure. FIG. 11 shows that the result for each supply alternative lies on an individual Pareto front and can be plotted in n-dimensional space.

Figure 12:
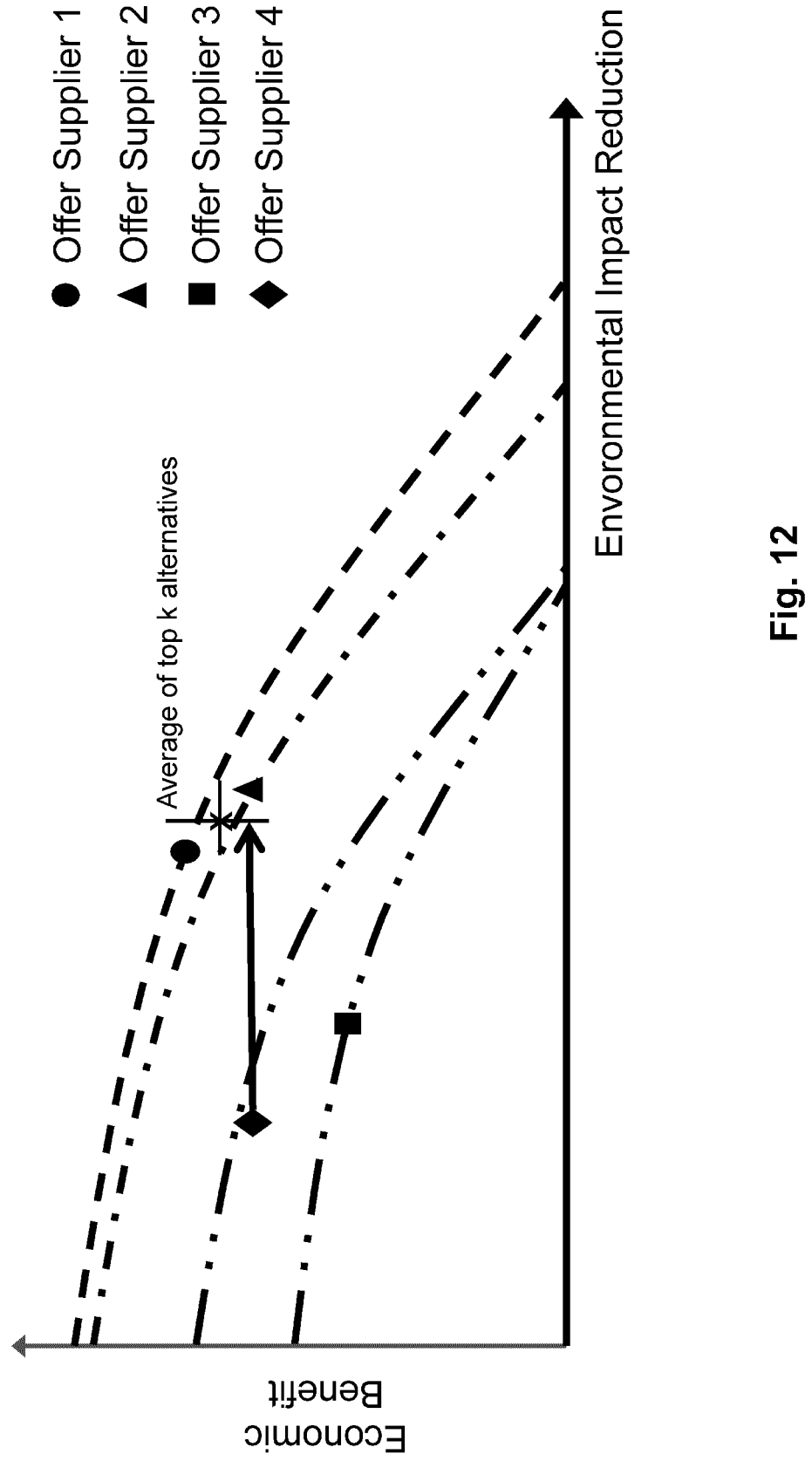
FIG. 12 is a flowchart that illustrates a distance in environmental impact reduction metric between low ranked alternatives and average of top k ranked alternatives according to some embodiments of the present disclosure.

FIG. 12 is a flowchart that illustrates a distance in environmental impact reduction metric between low ranked alternatives and average of top k ranked alternatives according to some embodiments of the present disclosure.

All definitions, as defined and used herein, should be understood to control over dictionary definitions, definitions in documents incorporated by reference, and/or ordinary meanings of the defined terms.

The indefinite articles "a" and "an", as used herein in the specification and in the claims, unless clearly indicated to the contrary, should be understood to mean "at least one".

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either", "one of", "only one of", or "exactly one of".

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising", "including", "carrying", "having", "containing", "involving", "holding", "composed of", and the like are to be understood to be open-ended, i.e., to mean including but not limited to. Only the transitional phrases "consisting of" and "consisting essentially of" shall be closed or semi-closed transitional phrases, respectively.

Furthermore, in this detailed description, a person skilled in the art should note that quantitative qualifying terms such as "generally", "substantially", "mostly", and other terms are used, in general, to mean that the referred to object, characteristic, or quality constitutes a majority of the subject of the reference. The meaning of any of these terms is dependent upon the context within which it is used, and the meaning may be expressly modified.

In another exemplary embodiment of the present disclosure, a computer program or a computer program element is provided that is characterized by being adapted to execute the method steps of the method according to one of the preceding embodiments, on an appropriate system. The computer program element might therefore be stored on a computer unit, which might also be part of an embodiment of the present disclosure. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the disclosure.

This exemplary embodiment of the disclosure covers both, a computer program that right from the beginning uses the disclosure and a computer program that by means of an up date turns an existing program into a program that uses the disclosure.

Further on, the computer program element might be able to provide all necessary steps to fulfil the procedure of an exemplary embodiment of the method as described above.

According to a further exemplary embodiment of the present disclosure, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. The computer program may also be distributed by printing the source code in a book, e.g. "Numerical Recipes".

According to a further exemplary embodiment of the present disclosure, a medium for making a computer program element available for downloading is provided, which computer program element is arranged to perform a method according to one of the previously described embodiments of the disclosure.

In the following further embodiments of the present disclosure are provided:

Embodiment 1. A computer-implemented method for producing a product by selection of one or more chemical precursors, the method comprising:

(a) receiving, from an interface, at least two data sets containing (i) material data and (ii) sustainability impact metrics data for the one or more chemical precursors necessary for manufacturing the product;

(b) providing a sustainability impact calculation model describing a functional relationship between the material data and sustainability impact metrics data;

(c) optionally retrieving, from a database, data specification information for the one or more chemical precursors, the data specification information comprising historic sustainability impact metrics corresponding to the one or more chemical precursors;

(d) ranking the at least two data sets by a distance from predefined minimum values in multiple dimensions of the sustainability impact calculation model and generating thereon based ranking results; and (e) optionally obtaining a degree of matching between the sustainability impact calculation model and the data specification information and generating thereon based matching results; and (f) selecting one or more chemical precursors out of a plurality of chemical precursors based on the ranking results and/or the matching results and adding the selected one or more chemical precursors to a production process of the product.

Embodiment 2. The method of embodiment 1, wherein the sustainability impact calculation model comprises at least one multi-criteria optimization algorithm.

Embodiment 3. The method of one of embodiment 1 and 2, wherein the product is a chemical product manufactured in a chemical production process from the one or more chemical precursors.

Embodiment 4. The method of embodiment 3, wherein the chemical product is defined by a chemical formulation.

Embodiment 5. The method of one of embodiments 1 to 3, wherein the product is a chemical product, preferably a polymeric product, wherein the one or more chemical precursors undergo a chemical reaction during manufacturing of the product.

Embodiment 6. The method of one of embodiments 1 to 5, wherein the method further comprises transmitting of improved sustainability impact metrics data if a deviation of the sustainability impact metrics data from predefined minimum values of the sustainability impact metrics data is above a predetermined threshold value.

Embodiment 7. The method of one of embodiments 1 to 6, wherein the method further comprises transmitting of updated sustainability impact metrics data if a degree of ranking and/or matching of the ranking results and/or the matching results is below a predetermined threshold value.

Embodiment 8. The method of one of embodiments 1 to 5, wherein the at least two data sets further contain economic data for the one or more chemical precursors.

Embodiment 9. A system configured for facilitating sustainable purchase of one or more chemical precursors for use in the manufacturing of a product, the system comprising: one or more hardware processors (210-1, 210-2, . . . , 210-N) configured by machine-readable instructions to carry out a method according to any one of embodiments 1 to 8.

Embodiment 10. A computing platform configured for facilitating sustainable purchase of one or more chemical precursors for use in the manufacturing of a product, the computing platform comprising:

a non-transient computer-readable storage medium having executable instructions embodied thereon to carry out a method according to any one of embodiments 1 to 8; and one or more hardware processors (320-1, 320-2, . . . , 320-N) configured to execute the instructions embodied in the non-transient computer-readable storage medium.

Embodiment 11. A method for sustainable production of a chemical product from chemical precursors, the method comprising:

producing the chemical product from the chemical precursors using during the production process the ranking results and/or the matching results of the method according to any one of embodiments 1 to 8.

Embodiment 12. A method for selecting one or more precursors for producing a chemical product, the method comprising:

selecting the one or more precursors for producing the chemical product using the ranking results and/or the matching results of the method according to any one of embodiments 1 to 8.

Embodiment 13. A method for selecting one or more production facility for producing a chemical product, the method comprising:

selecting the one or more production facility for producing the chemical product using the ranking results and/or the matching results of the method according to any one of embodiments 1 to 8.

Embodiment 14. Use of the ranking results and/or the matching results of the method according to any one of embodiments 1 to 8.

Embodiment 15. A computer program product comprising instructions which, when the program is executed by a computer, cause the computer to carry out the steps of the method according to any one of embodiments 1 to 8.

All features can be combined to provide a synergetic effect that is more than the simple summation of the features.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used.

Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A computer-implemented method for producing a product by selection of one or more chemical precursors, the method comprising:

(a) receiving, from an interface, at least two data sets comprising (i) material data related to chemical or physical properties of the one or more chemical precursors and (ii) environmental impact metrics data related to environmental impact metrics for the one or more chemical precursors necessary for manufacturing the product;

(b) providing an environmental impact calculation model describing a functional relationship between the material data and the environmental impact metrics data, the environmental impact calculation model associating a set of design parameters with a plurality of objective parameters that represent design characteristics of a system used to model a chemical production process for producing the product from the one or more chemical precursors, wherein the set of design parameters comprises original control and/or input parameters of the considered system;

(c) retrieving, from a database, historical environmental impact metrics data for the one or more chemical precursors, the historical environmental impact metrics data comprising historic environmental impact metrics corresponding to the one or more chemical precursors;

(d) ranking the at least two data sets by a distance from predefined minimum values in multiple dimensions of the environmental impact calculation model and generating thereon based ranking results; and (e) obtaining a degree of matching between the ranking results of the environmental impact calculation model and the historical environmental impact metrics data and generating thereon based matching results;

(f) selecting one or more chemical precursors out of a plurality of chemical precursors based on the ranking results and/or the matching results, and, for the selected one or more chemical precursors, generating operation conditions comprising machine-executable instructions for at least one of the design parameters, the machine-executable instructions being subject to one or more constraints that limit a range of the design parameters of the chemical production process; and (g) transmitting the operation conditions to an operating system used to operate the chemical production process during production of the product.

2. The method of claim 1, wherein the environmental impact calculation model comprises at least one multi-criteria optimization algorithm.

3. The method of claim 1, wherein the product is a chemical product manufactured in a chemical production process from the one or more chemical precursors.

4. The method of claim 3, wherein the chemical product is defined by a chemical formulation.

5. The method of claim 1, wherein the product is a chemical product, wherein the one or more chemical precursors undergo a chemical reaction during manufacturing of the product.

6. The method of claim 1, wherein the method further comprises transmitting of improved environmental impact metrics data if a deviation of the environmental impact metrics data from predefined minimum values of the environmental impact metrics data is above a predetermined threshold value.

7. The method of claim 1, wherein the method further comprises transmitting of updated environmental impact metrics data if a degree of ranking and/or matching of the ranking results and/or the matching results is below a predetermined threshold value.

8. The method of claim 1, wherein the environmental impact metrics data related to environmental impact metrics for the one or more chemical precursors necessary for manufacturing the product include: carbon footprint data, greenhouse gas emission data, resource usage data, air emission data, ozone depletion potential data, water pollution data, noise pollution or eutrophication potential data and/or biodegradability data.

9. A system configured for facilitating purchase of one or more chemical precursors for use in the manufacturing of a product, the system comprising: one or more hardware processors configured by machine-readable instructions to carry out a method according to claim 1.

10. A computing platform configured for facilitating purchase of one or more chemical precursors for use in the manufacturing of a product, the computing platform comprising:
   a non-transient computer-readable storage medium having executable instructions embodied thereon to carry out a method according to claim 1; and one or more hardware processors configured to execute the instructions embodied in the non-transient computer-readable storage medium.

11. A method for production of a chemical product from chemical precursors, the method comprising:
   producing the chemical product from the chemical precursors selected from the ranking results and/or the matching results of the method according to claim 1.

12. A method for selecting one or more precursors for producing a chemical product, the method comprising:
   selecting the one or more precursors for producing the chemical product using the ranking results and/or the matching results of the method according to claim 1.

13. A method for selecting one or more production facility for producing a chemical product, the method comprising:
   selecting the one or more production facility for producing the chemical product using the ranking results and/or the matching results of the method according to claim 1.

14. A non-transitory computer-readable medium having stored thereon instructions which, when executed by one or more processors, cause the one or more processors to carry out the steps of the method according to claim 1.

15. The method of claim 1, wherein the product is a polymeric product, wherein the one or more chemical precursors undergo a chemical reaction during manufacturing of the product.

* * * * *